Oct. 31, 1950
A. H. L. WONG
2,528,405
SOLDERING IMPLEMENT
Filed Aug. 3, 1948
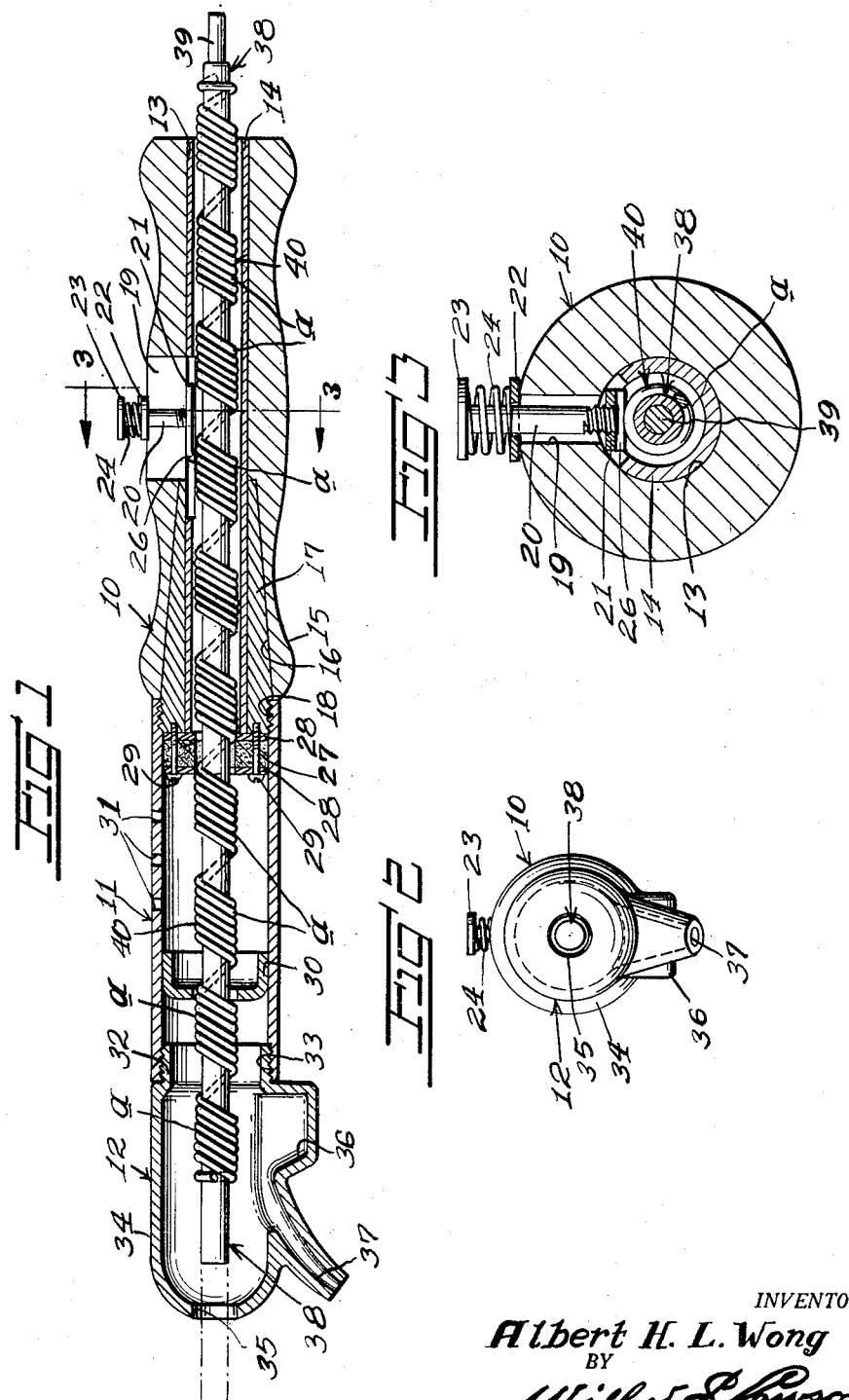
INVENTOR.
*Albert H. L. Wong*
BY
*Wilfred Lawson*
*Attorney*

Patented Oct. 31, 1950

2,528,405

UNITED STATES PATENT OFFICE 2,528,405

SOLDERING IMPLEMENT

Albert H. L. Wong, Seattle, Wash., assignor of one-half to Michael F. Morton

Application August 3, 1948, Serial No. 42,271

10 Claims. (Cl. 158—25)

This invention relates generally to the art of joining bodies of metal together by the application of molten metal to such bodies to function as a bond therebetween and the invention is directed primarily to an improved tool for carrying out this operation.

A principal object of the present invention is to provide an improved portable tool or device designed in a novel manner to carry solder, soldering flux and a means for melting the solder, in association with a novel applicator by means of which the molten metal can be applied to the work with utmost facility particularly where the work is located in a position where it would be difficult or impossible to perform the metal joining operation by the usual means of applying a heating tool and a stick of solder as separate or individual units.

Another object of the invention is to provide a tool of the character stated wherein means is provided for feeding a combustible element and the flux carrying solder into a melting chamber from which the molten metal is fed onto the work, means being provided also for advancing the solder and the combustible element by which the solder is melted, into the melting chamber as the previously melted solder is used up.

A further and more specific object of the invention is to provide a tool of the character stated comprising a handle member, a relatively long tubular housing attached thereto and a removable retort or melting chamber attached to the tubular housing, together with a rod of fusable material carrying a wrapping of solder and extended through the housing and into the retort chamber where the solder is melted through the medium of the burning fusable rod, the melted solder being fed from the retort or combustion chamber for the rod through a suitable spout and onto the work.

Still another object of the invention is to provide a tool of the above described character having means in the handle facilitating the advancement of the fusable or combustible rod and the solder wire, as the rod and wire are used up.

Still another object of the invention is to provide a tool of the character previously stated wherein the rod and solder wire are passed through an element which functions, upon retraction of the rod and solder wire to the proper extent, to quench the burning rod and thus check the operation of the tool.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawing:

Figure 1 is a longitudinal section of the device constructed in accordance with the invention.

Figure 2 is a front end elevation of the same.

Figure 3 is a transverse section taken on the line 3—3 of Figure 1 on an enlarged scale.

Referring now more particularly to the drawing it is to be noted that the implement comprises three main sections or units consisting of a handle unit which is generally designated 10, an intermediate relatively long tubular housing unit which is generally designated 11, and a terminal retort or combustion head unit which is generally designated 12.

The handle unit 10 which may be formed of wood or any other suitable material, has an axial passage 13 therethrough in which is fitted a tubing 14 of heat insulating material.

The forward end of the handle body which is designated 15, has a tapered socket 16 which in reality forms an enlargement of the passage 13, in which is fitted the tapered tubular plug 17, the forward end of which projects beyond the forward end of the handle body 15 and is externally screw threaded as indicated at 18. As shown the tubing 14 extends through the center of this tubular plug 17 to the forward end thereof.

Substantially midway between the ends of the handle body 15 there is formed the relatively narrow longitudinally extending slot 19. Extending through this slot 19 is a pin 20 which at its inner end extends through and is fastened to a slide plate 21, which plate has a greater length than width and extends longitudinally of the slot. The width of the slide plate 21 is slightly greater than that of the slot so that the plate bridges the slot and is held against movement therethrough but is adapted to have sliding movement lengthwise of the slot.

At the outer side of the slot the pin is encircled by a washer 22 which also bridges the slot and rests upon the outer surface of the handle body and interposed between this washer and the head 23 of the pin, is a spring 24 which constantly urges outward movement of the pin and thus constantly maintains the slide plate 21 firmly against the inner side of the passage.

The forward edge of the slide plate 21 is turned down to provide a thin lip as indicated at 25 which engages the soldering material and combustible rod for the purpose hereinafter described.

The back end of the tubular housing 11 is internally threaded as indicated at 26 to receive the threaded forward end portion of the wedge 17 whereby the housing and the handle unit are solidly coupled together.

Snugly fitted into the rear end of the housing unit is a relatively thick asbestos washer 27 which is held between the two annular plates 28 and this washer and the plates 28 are secured to the end of the wedge portion of the handle unit by the screws 29. The opening through the washer is approximately the same diameter as the inside of the tubing 13.

Within the tubular housing 11 is snugly frictionally fitted a collar 30, the opening through which is of approximately the same diameter as the inside diameter of the tubing 13 and of the asbestos collar 27 and is coaxial with the tubing and washer.

Between the collar 30 and the asbestos washer 27, the tubular housing is provided with several openings 31 in the wall thereof which function as ventilating openings to prevent the interior of the tubular housing becoming too hot.

At its forward end the housing 11 is internally screw threaded as indicated at 32 and it receives in this threaded end the reduced collar end 33 which forms an integral part of the retort unit. This retort unit comprises a long housing body 34, one end of which has the reduced externally threaded collar 33 for engagement with the threads 32 of the tubular housing while the forward end is rounded off and has the relatively small axial opening 35 therethrough.

Adjacent to the rear end of the retort body there is formed a pocket or sump 36 and immediately in advance of this sump the housing has leading therefrom the forwardly and downwardly curving discharge spout 37 through which is discharged molten metal onto the body of work.

The solder and heat producing element are combined to form a long bar like unit which is generally designated 38 and which is designed to be extended through the implement from the rear end of the handle unit 10 as illustrated, the forward end of such solder and heating unit being located, during the operation of the device, within the retort unit 12.

The unit 38 consists more particularly of a long rod of a suitable combustible material which when ignited will develop sufficient heat to properly melt the solder with which it is associated. The specific composition of such a rod forms no part of the present invention and accordingly it is not believed necessary to set forth any specific composition as being used or preferable in connection with the use of the invention. One example of such a rod which would give satisfactory results is the pyrotechnic article commonly sold under the name of "Sparkler." Such Sparklers are conventionally made up of a composition comprising a slurry of barium nitrate and aluminum powder with iron filings, combined with an adhesive, such as dextrine, glue or gum arabic and a small quantity of magnesium carbonate. The combustible rod forming a part of the unit 38 is designated 39 and this has wound thereon a rope of strand of solder material of the type commonly manufactured in tubular form and containing a suitable flux. This solder winding is designated 40 and as shown it is wound in connected sections designated $a$ by wrapping a number of convolutions closely together and then applying a long winding around the rod and forming another group of closely wound convolutions. By this arrangement it is possible to prevent the formation of a larger quantity of molten solder in the retort than might be desired at one time.

The overall diameter of the solder rod unit 38 is approximately equal to or slightly less than the inside diameter of the tubing 14 and the aperture through which the unit must pass as for example in the asbestos washer and the metal collar 30. When the unit 38 is run through the implement in the manner illustrated the turned down lip 25 of the plate 21 will engage the convolutions of the solder winding and the operator, holding the handle unit 10 in his hand, can effect the advancement of the unit 38 by pressing down on the pin 20 to cause the lip 25 to firmly engage the solder winding and then pressing forwardly against the head of the pin so as to slide the pin and the parts connected therewith forwardly and effect the advancement of the solder rod unit.

The combustion rod 39 is first advanced through the opening 35 in the retort head and is ignited. It is then drawn back into the retort head and allowed to burn where it will develop sufficiently high temperature to freely melt the solder which will go down into the sump 36 from which it may be run through the spout 37 onto the work. It will thus be seen that with this implement the solder can be introduced into small spaces where it would not be possible to use the separate and customary soldering iron and solder stick.

Where it may be necessary to turn the implement up the collar 30 prevents molten solder running back into the tubular housing 11.

When it is desired to stop the burning of the rod 39 the entire solder-rod unit can be drawn back until the burning end is within the opening of the asbestos washer 27 by which it will be extinguished. It will be understood, of course, that this rearward movement of the unit 38 will not be interfered with by the tongue 25 as the spring 24 will raise the pin and plate 21 so as to disengage the tongue from the solder wrapping.

By making the retort unit 12 detachable it will be readily apparent that units of various sizes may be provided for attachment to the forward end of the housing unit 11 to meet requirements of the particular soldering jobs to be performed.

From the foregoing it will be readily apparent that there is provided in the present invention a novel implement whereby the work of joining metal bodies by molten metal such as solder or the like may be easily and quickly carried out. In addition to providing a means for supplying molten solder the retort head unit may be employed also for heating the work as is required, prior to flowing the molten metal thereon thus making it possible to obtain a good bond between the molten metal and the metal bodies to which it is applied.

I claim:

1. A portable implement of the character described comprising, in combination, a handle, a hollow retort head connected with the handle, said retort head having a molten metal discharge spout, and a molten metal producing means carried by the handle and movable forwardly therefrom into the retort and comprising a combustible heat producing element and bonding metal carried thereby and adapted to be melted by the heat producing element within the retort for discharge through said spout.

2. A portable implement of the character described in claim 1 wherein said handle has a tubular passage therethrough through which the combustible element in the form of a long rod is extended together with the meltable bonding metal, said retort unit having a forward end provided with an opening through which the combustible rod may be extended to be ignited.

3. A portable implement of the character described in claim 1 wherein said retort is in the form of a relatively long chamber and has the wall provided with a molten metal receiving sump immediately to the rear of the discharge spout.

4. A soldering implement of the character described, comprising, in combination, a relatively long handle having a passage axially therethrough, a tubular housing connected with one end of the handle coaxial with said passage, a molten metal receiving retort connected with said housing and having a rear end opening coaxial with the housing and the passage, said retort having a forwardly and downwardly extending metal discharging spout, a combustible heat producing rod, and a bonding metal carried by the rod throughout substantially the entire length thereof, said rod and bonding metal forming an adjustable unit adapted for extension through said passage, housing and retort, the combustible rod when ignited at its forward end producing the requisite heat to melt the bonding metal within the retort for discharge through said spout.

5. An implement of the character described in claim 4, with means carried by the handle and extending into the passage for contact with the rod and bonding metal unit for longitudinally shifting said unit.

6. An implement of the character described in claim 4 wherein said retort is in the form of a long head having an opening in its forward end coaxial with the housing for the extension of the adjacent end of the rod therethrough to facilitate igniting the rod.

7. An implement of the character described in claim 4 wherein said retort is in the form of a relatively long axially extending housing, the wall of the retort being formed to provide a molten metal receiving sump at the rear of said discharge spout from which the molten metal may be caused to flow into and through the spout.

8. An implement of the character described in claim 4, with a relatively thick asbestos washer disposed within the tubular housing adjacent to the handle, through which the rod and bonding metal unit extend, said washer functioning as a means for extinguishing the ignited rod when the burning end thereof is drawn rearwardly into the washer.

9. A soldering implement of the character described comprising, in combination, a relatively long handle having a passage formed axially therethrough, a tubular housing, means at the forward end of the handle for connection in an end of the housing to secure the housing in longitudinal alignment with the handle, the opposite end of the housing being screw threaded, a relatively long retort body forming a metal fusing chamber, one end of the retort body being open and adapted for threaded connection with the said other end of the housing whereby the retort body extends axially from the forward end of the housing, the opposite end of the retort chamber having a central aperture, means forming a fused metal discharge spout for the retort chamber, a rod of combustible material, fusable bonding metal carried by the rod throughout substantially the entire length thereof, the rod and bonding metal forming an integral unit adapted for extension through the handle passage and housing into the retort chamber, the forward end of the rod being adapted for extension through the said central opening of the retort chamber to facilitate igniting the rod, and means supported on the handle for limited movement longitudinally thereof for engagement with and advancing the said unit.

10. A soldering implement of the character described in claim 9 wherein said last means comprises a pin member, a longitudinally extending slot in the handle through which the pin member extends, a plate attached to the inner end of the pin member within the passage and having an inwardly directed lip for engagement with said rod and metal unit, a collar encircling the pin and slidably supported upon the outer side of the handle, the pin having a head upon its outer end, and an expansion spring interposed between said head and collar and normally urging outward movement of the pin and the plate carried thereby.

ALBERT H. L. WONG.

No references cited.